US009185383B2

(12) United States Patent
Barrett et al.

(10) Patent No.: US 9,185,383 B2
(45) Date of Patent: Nov. 10, 2015

(54) SYSTEM AND METHOD FOR PROVIDING OPTIMAL DISPLAY OF VIDEO CONTENT

(75) Inventors: Timothy Alan Barrett, Pymble (AU); Ben Crosby, Murphy, TX (US)

(73) Assignee: Thomson Licensing, Issy les Moulineaux (FR)

( * ) Notice: Subject to any disclaimer, the term of this patent is extended or adjusted under 35 U.S.C. 154(b) by 314 days.

(21) Appl. No.: 13/515,385

(22) PCT Filed: Jun. 2, 2010

(86) PCT No.: PCT/US2010/037060
§ 371 (c)(1),
(2), (4) Date: Jun. 12, 2012

(87) PCT Pub. No.: WO2011/084169
PCT Pub. Date: Jul. 14, 2011

(65) Prior Publication Data
US 2012/0249736 A1 Oct. 4, 2012

Related U.S. Application Data

(60) Provisional application No. 61/292,916, filed on Jan. 7, 2010.

(51) Int. Cl.
*H04N 13/00* (2006.01)
(52) U.S. Cl.
CPC .................................. *H04N 13/0029* (2013.01)
(58) Field of Classification Search
None
See application file for complete search history.

(56) References Cited

U.S. PATENT DOCUMENTS

| 6,163,337 | A | 12/2000 | Azuma et al. |
| 6,466,255 | B1 | 10/2002 | Kagita et al. |

(Continued)

FOREIGN PATENT DOCUMENTS

| JP | 0877707 | 3/1996 |
| JP | 10191396 | 7/1998 |

(Continued)

OTHER PUBLICATIONS

Kim et al., "The Adaptation of 3D Stereoscopic Video in MPEG-21 DIA," Signal Processing: Image Communication, Elsevier Science Publishers, vol. 18, No. 8, Sep. 1, 2003, pp. 685-697.

(Continued)

*Primary Examiner* — Dave Czekaj
*Assistant Examiner* — Nam Pham
(74) *Attorney, Agent, or Firm* — Robert D. Shedd; Vincent E. Duffy; Michael A. Pugel

(57) ABSTRACT

Video display capabilities for use in the home continue to evolve. A method is described including receiving a video signal in a first format, determining at least one parameter associated with the signal and a display device, converting the signal to a signal in a second format based on the signal and display device parameters, and converting the second signal to a display signal based on the display device parameter. An apparatus is described including an input stream processor that decodes and separates a received signal, a controller that determines at least one characteristic of the signal and a display device, a video signal processor circuit that converts the signal to a second signal based on the characteristics and further converts the second signal to an output signal based on a characteristic of the display device, and an interface circuit that provides the output signal to the display device.

36 Claims, 7 Drawing Sheets

(56) References Cited

U.S. PATENT DOCUMENTS

| | | | |
|---|---|---|---|
| 6,704,042 B2 | 3/2004 | Matsui et al. | |
| 6,778,221 B1 | 8/2004 | Nishioka et al. | |
| 7,580,463 B2 | 8/2009 | Routhier et al. | |
| 7,724,271 B2 | 5/2010 | Ha et al. | |
| 8,331,711 B2 | 12/2012 | Gangwal et al. | |
| 8,660,402 B2 | 2/2014 | Newton et al. | |
| 2003/0128273 A1* | 7/2003 | Matsui et al. | 348/51 |
| 2008/0246757 A1 | 10/2008 | Ito | |
| 2008/0285863 A1* | 11/2008 | Moon et al. | 382/232 |
| 2010/0060719 A1* | 3/2010 | Watanabe | 348/47 |
| 2010/0165081 A1* | 7/2010 | Jung et al. | 348/46 |
| 2011/0052142 A1* | 3/2011 | Sultenfuss et al. | 386/232 |

FOREIGN PATENT DOCUMENTS

| | | |
|---|---|---|
| JP | 2000165821 | 6/2000 |
| JP | 2000197074 | 7/2000 |
| JP | 2000209614 | 7/2000 |
| JP | 2000350237 | 12/2000 |
| JP | 2005522958 | 7/2005 |
| JP | 2006033851 | 2/2006 |
| JP | 2006135747 | 5/2006 |
| JP | 2006203668 | 8/2006 |
| JP | 2007195045 | 8/2007 |
| JP | 2008500790 | 1/2008 |
| JP | 2009296144 | 12/2009 |
| JP | 2010506287 | 2/2010 |
| JP | 2011510527 | 3/2011 |
| WO | WO2005114998 | 12/2005 |
| WO | WO2008041178 | 4/2008 |
| WO | WO2009077929 | 6/2009 |

OTHER PUBLICATIONS

Search Report Dated Sep. 27, 2010.

* cited by examiner

SYSTEM AND METHOD FOR PROVIDING OPTIMAL DISPLAY OF VIDEO CONTENT

CROSS REFERENCE TO RELATED APPLICATIONS

This application claims the benefit, under 35 U.S.C. §365 of International Application PCT/US10/037060, filed Jun. 2, 2010, which was published in accordance with PCT Article 21(2) on Jul. 14, 2011 in English and which claims the benefit of U.S. provisional patent application No. 61/292,916, filed Jan. 7, 2010.

FIELD OF THE INVENTION

The present disclosure relates generally to the operation of a video signal processing system and more specifically to the receiving and processing of video signals in a signal processing device for display on a video display device.

BACKGROUND OF THE INVENTION

This section is intended to introduce the reader to various aspects of art, which may be related to various aspects of the present invention that are described below. This discussion is believed to be helpful in providing the reader with background information to facilitate a better understanding of the various aspects of the present invention. Accordingly, it should be understood that these statements are to be read in this light, and not as admissions of prior art.

Video display capabilities, and in particular three-dimensional (3-D) and multi-view display capabilities, continue to evolve. In recent years the technology has moved from primarily being used in mass audience presentations, such as movie theaters, to being provided to the home via delivery systems such as broadband or broadcast communications systems or using media such as Blu_ray 3-D. While there are only a limited number of standards used in movie theatres, there have been numerous attempts to get 3-D into the home, and therefore the standards for 3-D content delivery and display in the home still remain unclear. Independent of the display technology, existing 3-D content may be provided in a number of signal formats, including but not limited to anaglyph (e.g. red/blue or colorcode) for simulating 3-D on 2-dimensional (2-D) displays, checkerboard (typically used for digital light projector (DLP) displays), side by side, over/under, line interleaved, temporally interleaved, quincunx, Multiview Video Coding (MVC), and interleaved progressive frames at 48 frames per second (fps) (e.g. 2×24 fps) or 60 fps (e.g. 2×30 fps), as well as Sensio and other proprietary formats.

These signal formats represent only several of the current possibilities; with more expected to emerge as the technology evolves. In addition to the various signal formats introduced, several display types exist, including but not limited to cathode ray tube (CRT), DLP, Plasma, liquid crystal display (LCD), organic light emitting diode (OLED), or similar display and may include special lens systems including, for instance, a lenticular lens display. Still further, several display modes, or technologies, exist, for the user to experience a 3-D or multi-view image, including but not limited to shutter glasses, polarized lens glasses, colorized lens glasses for anaglyph 3-D content, alternating display polarization, and autostereoscopic display technology. As standards for 3-D in the home continue to emerge, many existing display devices will be incapable of displaying any modern 3-D content. The presence of all of the signal formats, modes, displays, and technologies, as well as the various combinations, represents a very difficult user experience for the home viewer.

Mechanisms to convert the input format of a video signal to match the type of display and the type of format are needed to improve the operation of 3-D in the home. Some modern video processing systems, such as the 9800 system from NVidia, address some of the conversion issues. However, conversion systems remain very limited and do not appear to address any issues related to analyzing the content, the display type, and the mode to determine the optimal display experience for the user. In many other cases, the video processor system simply acts largely as a pass-through for the 3-D formatted signal content, and relies on the processing and operations of the display.

In addition, some users who own one of the 3-D capable displays may wish to view content received in a more conventional 2-D format on the 3-D display. Other viewers may have only a conventional 2-D display, but may wish to view the 3-D content in a best possible 3-D display mode. Still further, as multi-view signal formats and displays emerge, no conversion paths exist for converting 2-D or 3-D content to multi-view content and vice versa. Today, no solutions exist that address the optimal operation of the display device and mode or technology to allow the user greater content display flexibility. Therefore there is a need for a system and method to provide a seamless user friendly operation to allow display devices to display advanced video content, including 2-D, 3-D, or multi-view content, in the best manner possible.

SUMMARY OF THE INVENTION

In accordance with an aspect of the present embodiments, a method is described including receiving a video signal in a first video signal format, determining at least one parameter associated with the first video signal format for the received video signal, determining at least one parameter associated with a display device, converting the received video signal to an intermediate video signal in a second video format based on the at least one parameter associated with the first video signal and the at least one parameter associated with the display device, and converting the intermediate video signal to a video display signal based on the at least one parameter associated with the display device.

In accordance with another aspect of the present embodiments, an apparatus is described including an input stream processor, the input stream processor decoding a received signal and separating the decoded signal into a video portion and an audio portion, a controller coupled to the input stream processor, the controller determining at least one characteristic of the video portion of the decoded signal and determining at least one characteristic of a display device, a video signal processor circuit coupled to the input stream processor and controller, the video signal processor circuit converting the video portion of the decoded signal from a first video format to a second video format based on the at least one characteristic of the video portion of the decoded signal and at least one characteristic of the display device, the video signal processor circuit also converting the first converted video signal in the second video format to a display output signal in a third video format, and an interface circuit coupled to the video signal processor, the interface circuit providing the display output signal to the display device.

Figure 1:
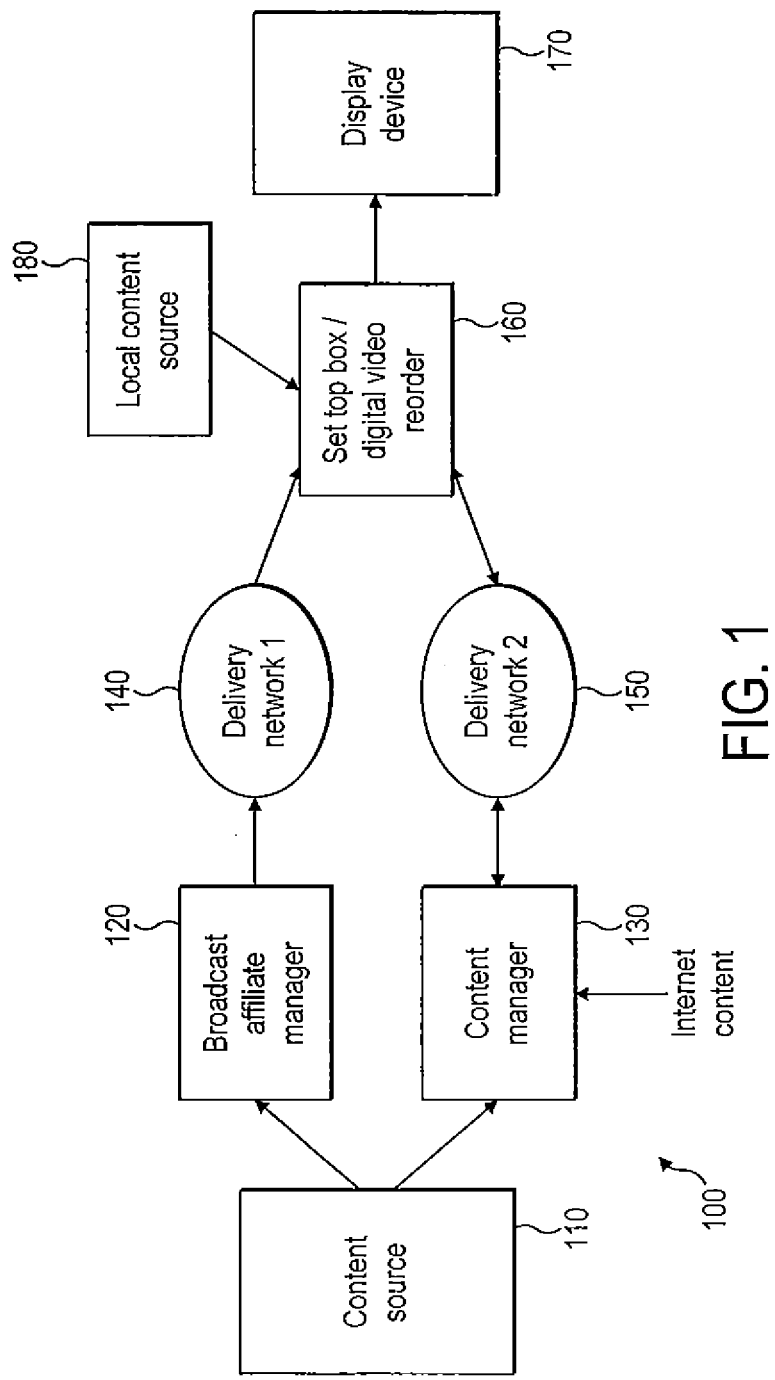
FIG. 1 is a block diagram of an embodiment of a content delivery system of the present disclosure.

The characteristics and advantages of the present disclosure may become more apparent from the following description, given by way of example.

DETAILED DESCRIPTION

It should be understood that the elements shown in the FIGs. may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with, or through, one or more intermediate components. Such intermediate components may include both hardware and software based components.

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the FIGs. may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

One or more specific embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort would nevertheless be a routine undertaking of design, fabrication, and manufacture for those of ordinary skill having the benefit of this disclosure.

The following describes a system relating to video signals, and more particularly to video signals as defined and delivered over a signal transmission system, such as a terrestrial, satellite, cable, or broadband Internet system, to a receiving device at user's premises for display. In addition, the system may include a device that delivers content from local storage, including local disks, some form of network attached storage, or video serving devices, or from other devices in the home network. The embodiments described may be used in a settop box, or similar video processing device. The embodiments may also be used in a television in which the functions attributed to the settop box may be applied to the video decoding capability of the television, or similar video signal display device. Examples of similar devices include, but are not limited to, cellular phones, intelligent phones, personal digital assistants, personal video recorders, media players, game consoles, disk players, and laptop computers. Other systems utilized to receive other types of signals may include similar structures and processes. Those of ordinary skill in the art will appreciate that the embodiments of the circuits and processes described herein are merely one set of potential embodiments. It is important to note that signals compliant with various broadcast and wireless standards in general, may be transmitted in a manner other than over a terrestrial, satellite, or cable network, including transmission over the air, through a wireless network, over telephone lines, power lines, or coax cable, or through some other local media. As such, in alternate embodiments, the components of the system may be rearranged or omitted, or additional components may be added. For example, with minor modifications, the system described may be configured for use in other terrestrial broadcast services, wi-fi video and audio services, or phone data services, including services used elsewhere in the world.

The embodiments described below are primarily related to reception and processing of signals. Certain aspects of the embodiments including, but not limited to, certain control signals and power supply connections have not been described or shown in the figures but may easily be ascertained by a skilled artisan. It should be noted that the embodiments may be implemented using hardware, software, or any combination of both, including the use of a microprocessor and program code or custom integrated circuits. It should also be noted that many of the embodiments involve iterative operation and connection between the various elements of the embodiments. Alternative embodiments may be possible using pipelining architectures employing repeated identical elements, connected in series, in place of, or in addition to, the iteration operation embodiments described herein.

The disclosed embodiments are directed at a system and method for providing optimal display of video content. More specifically, the embodiments are directed at signal processing that detects or determines the supported and preferred 2-D, 3-D, or multi-view formats of a display device, along with the modes or technology available, and uses this information to process and convert the received 2-D, 3-D, or multi-view content such that the signal processor provides the content in a format that is both appropriate or optimal for the display.

Turning now to the drawings and referring initially to FIG. 1, an exemplary embodiment of a content delivery system 100 using aspects of the present disclosure is shown. System 100 delivers content, including 3-D content, in the form of audio and video programs, over one of two possible delivery networks to users' homes. Although system 100 primarily describes delivery of 3-D content, the system may equally apply to delivery of other video content, such as enhanced 2-D content, or multi-view content.

In system 100, 3-D content, along with 2-D content originates from, and is provided by, a 3-D content source 110, such as a movie studio or production house. 3-D content source 110 provides a broadcast content signal to a broadcast affiliate manager 120. 3-D content source 110 also provides a special content signal to content manager 130. The broadcast affiliate manager 120 and content manager 130 each connect to a settop box 160, typically residing at or near a user's home, through delivery network 140 and delivery network 150 respectively. The content may also be delivered to settop box 160 from local content source 180. Settop box 160 connects to display device 170 at a user's home and is used for viewing the delivered video content.

As described above, 3-D content source 110 may supply content in at least one of two forms. One form may be broadcast content delivered to the broadcast affiliate manager 120. The broadcast affiliate manager 120, which is typically a national broadcast service, such as the American Broadcasting Company (ABC), Columbia Broadcasting System (CBS), or National Broadcasting Company (NBC), may collect and store the content. The broadcast affiliate manager 120 may also be a broadcast service associated with cable or satellite signal content delivery. The broadcast affiliate manager 120 may also schedule delivery of the content over delivery network 140. The broadcast affiliate manager 120 ultimately provides the content for delivery, based on a schedule or otherwise, over delivery network 140. Delivery network 140 may include a satellite transmission link from a national center to one or more regional or local centers. Delivery network 140 may also include a localized content delivery network using local delivery systems such as over the air broadcast, satellite broadcast, or cable broadcast. The delivered broadcast content is provided to the input of settop box 160 through a delivery network interface on settop box 160.

3-D content source 110 may also provide special content to content manager 130. Special content may include content delivered as premium viewing, pay-per-view content, 3-D movies or videos, games, enhancement features to the broadcast content, or any other content otherwise not provided to the broadcast affiliate manager 120. Content manager 130 manages, repackages, and schedules the delivery of content over delivery network 150. In many cases the special content may be content requested by the user and managed and delivered over delivery network 150 by content manager 130. Content manager 130 may be a service provider, such as an internet website. Content manager 130 may also be affiliated with a content provider such as the 3-D content source, broadcast service such as a broadcast affiliate manager 120, or a delivery network service. Content manager 130 may also incorporate other internet content not provided by the 3-D content source through a separate internet connection.

Content manager 130 may deliver the content to settop box 160 over a separate delivery network, such as delivery network 150. Delivery network 150 may include a high speed two way broadband internet type communications system. It is important to note that some or all of the content from the broadcast affiliate manager 120 may also be delivered using all or parts of delivery network 150 and some or all of the content from the content manager 130 may be delivered using all or parts of delivery network 140. The special content is provided to the input of settop box 160 through a content delivery network interface on settop box 160.

Local content source 180 may also deliver content to settop 160. Local content source 180 may provide content that was not delivered over either delivery network 140 or delivery network 150, but may still be based on content originating from 3-D content source 110. Additionally, local content source 180 may provide content, such as user created or computer generated content, where the content is not transmitted, but instead is generated or reproduced locally. Local content source 180 may include a local portable storage device, such as a hard disk drive, or a removable media such as a compact disk (CD) or digital versatile disk (DVD). Local content source 180 may be included as part of an entertainment or information device, such as a game console or personal computer.

Settop box 160 receives content in the form of a received signal from one or both of delivery network 140 and delivery network 150 or from local content source 180. Settop box 160 separates and processes the content, including selecting and decoding one or more channels or program streams. Settop box 160 may provide a separation of the received content based on user preferences and commands. More specifically, settop box 160 identifies and determines the format of the received signal and converts the received signal into a display signal format after determining the best available, or optimal, signal format for display. Further details of the operation of signal receiving devices such as settop box 160 will be described below. The selected and processed content, in the form of audio and video signals, is provided to display device 170. Display device 170 may be a conventional 2-D type display. Display device 170 may alternatively be an advanced 3-D display requiring a specific 3-D signal format input in order to display 3-D content. The user may also incorporate a 3-D mode or technology that can be used with either the 2-D or 3-D characteristics of display device 170. For instance, the user may use colorized lens glasses to view an anaglyph processed signal on a conventional 2-D display. The user may also use polarized glasses or shutter glasses synchronized to a 3-D display. Finally, the display device 170 may be an advanced multi-view display that includes an autostereoscopic or other type of multi-view display lens.

Settop box 160 may also include an interface for communication over delivery network 150. For instance, settop box 160 may communicate information to content manager 130, including display device identification information, content search requests, or direct content requests. Settop box 160 may also receive information including downloadable software applications and updates, custom content based on requests, and search request results over delivery network 150.

Figure 2:
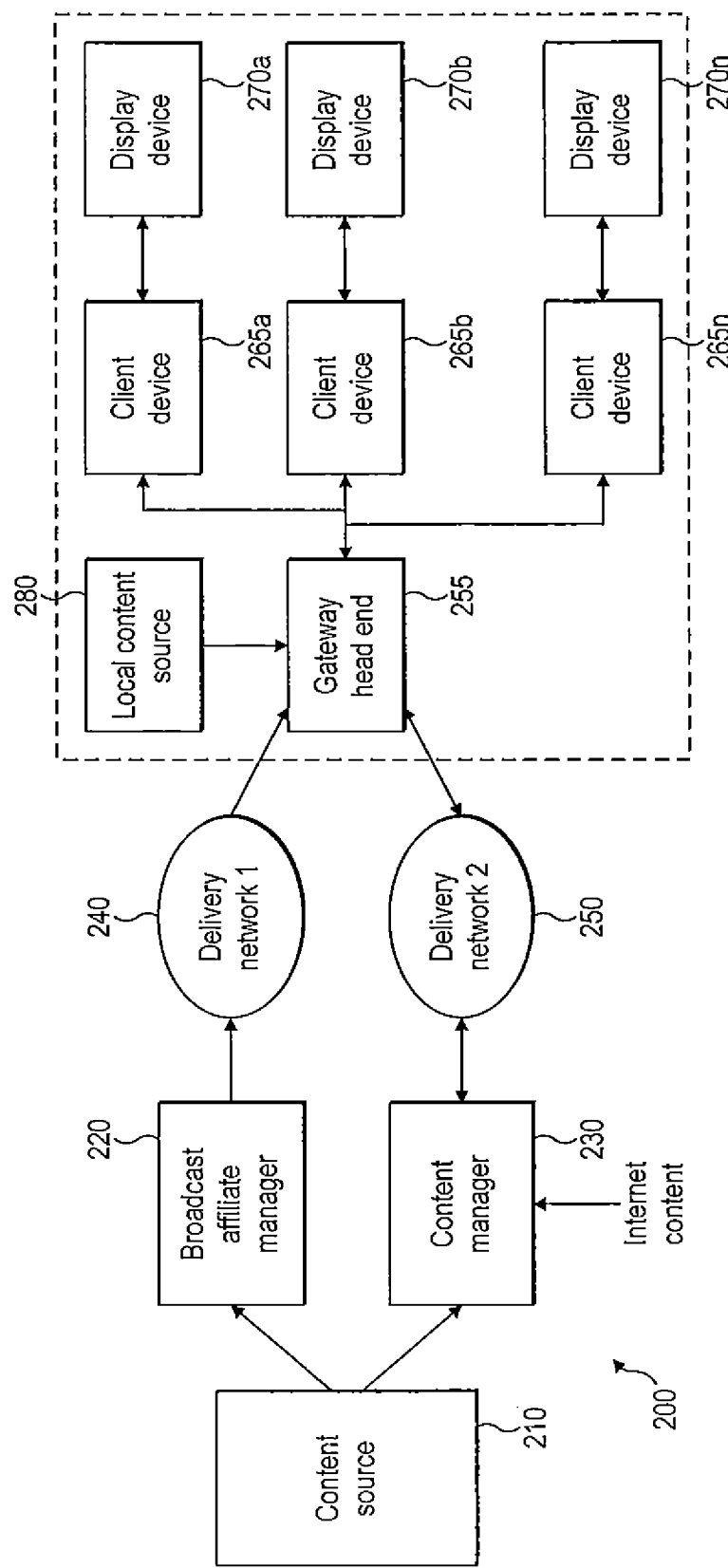
FIG. 2 is a block diagram of another embodiment of a content delivery system of the present disclosure.

Turning FIG. 2, another embodiment of a content delivery system 200 using aspects of the present disclosure is shown. System 200 delivers content, including 3-D content, in the form of audio and video programs, over one of two possible delivery networks to single or multiple dwelling units, such homes, apartments, and hotels. The content is provided to a gateway or head-end device. The gateway or head-end device distributes the content to multiple client devices and display devices within individual rooms, apartments, or living quarters with the dwelling units. Although system 200 primarily describes delivery of 3-D content, the system may equally apply to delivery of other video content, such as enhanced 2-D content, or multi-view content.

In system 200, 3-D content, along with 2-D content originates from, and is provided by, a 3-D content source 210, such as a movie studio or production house. 3-D content source 210 provides a broadcast content signal to a broadcast affiliate manager 220. 3-D content source 210 also provides a special content signal to content manager 230. The broadcast affiliate manager 220 and content manager 230 each connect to gateway head end device 255, typically residing at or near a single or multiple dwelling unit, through delivery network 240 and delivery network 250 respectively. Additional content may also be delivered to gateway head end device 255 from local content source 280. It is important to note that when gateway head end device 255 is used in a single dwelling unit setting, it is often referred to as a gateway or router device. When gateway head end device 255 is used in a multiple dwelling unit setting it is often referred to as a head end device. Gateway head end device 255 connects to each of a plurality of client devices 265a-265n located throughout the dwelling unit. Each of the plurality of client devices 265a-265n connects to display devices 270a-270n and is used for viewing the delivered video content. The operation and function of 3-D content source 210, broadcast affiliate manager 220, content manager 230, delivery network 240, delivery network 250, display devices 270a-270n, and local content source 280 are similar to those similar named elements in FIG. 1 and will not be described in further detail here.

The gateway head end 255 receives content in the form of a received signal from one or both of delivery network 240 and delivery network 250 or from local content source 280. Gateway head end 255 may include circuitry tuning, demodulating, and demultiplexing multiple channels or program streams simultaneously. This circuitry may contain a plurality of tuners, demodulators, and demultiplexers to convert the received signal into a plurality of data streams, each of which carries a program or service (e.g., television channel video, television channel audio, program guides, and so forth). Gateway head end 255 also includes processing circuitry for interfacing to a local area network within the dwelling unit in order to provide the program or services to the client devices 265a-265n. In one embodiment, gateway head end 255 includes an Internet protocol (IP) wrapper circuit to interface to client devices 265a-265n over Ethernet.

The gateway head end 255 may be coupled to client devices 265a-265n over the local area network. Although not shown, the local area network may include one or more routers, switches, modem, splitters, or bridges. The local area network may also include wireless interfaces in addition to wired interfaces. The client devices 265a-265n may be any suitable type of video, audio, and/or other data receiver capable of receiving data from gateway head end device 255, such as IP packets. It will be appreciated the term client device, as used herein, may encompass not only devices that sit upon televisions. Rather the client devices 265a-265n may be any device or apparatus operating as an end user device in a dwelling, whether internal or external to a television, display, or computer, that can be configured to function as described herein including, but not limited to, video components, computers, wireless telephones, or other forms video recorders.

Gateway head end device 255 may also include an interface for communication over delivery network 250. For instance, gateway head end device 255 may communicate information to content manager 230, including display device identification information, content search requests, or direct content requests received from one or more of the client devices 265a-265n. Gateway head end 255 may also receive information including downloadable software applications and updates, custom content based on requests, and search request results over delivery network 250 and provide this information to one or more of the client devices 265a-265n.

The client devices 265a-265n process the data signal containing the video program streams received from gateway head end device 255 over the local area network. In addition, client devices 265a-265n may receive and process individual user requests for content and provide those requests to gateway head end 255. The IP wrapper circuit in gateway head end 255 may be configured to receive those requests from client devices 265a-265n and to multicast (i.e., broadcast over an IP address) the program or service content to those client devices 265a-265n that had requested the particular program or service. The selected and processed program or service content, in the form of audio and video signals, is provided to display devices 270a-270n. Further details of the operation of gateway head end 255 and client devices 265a-265n will be described below.

Figure 3:
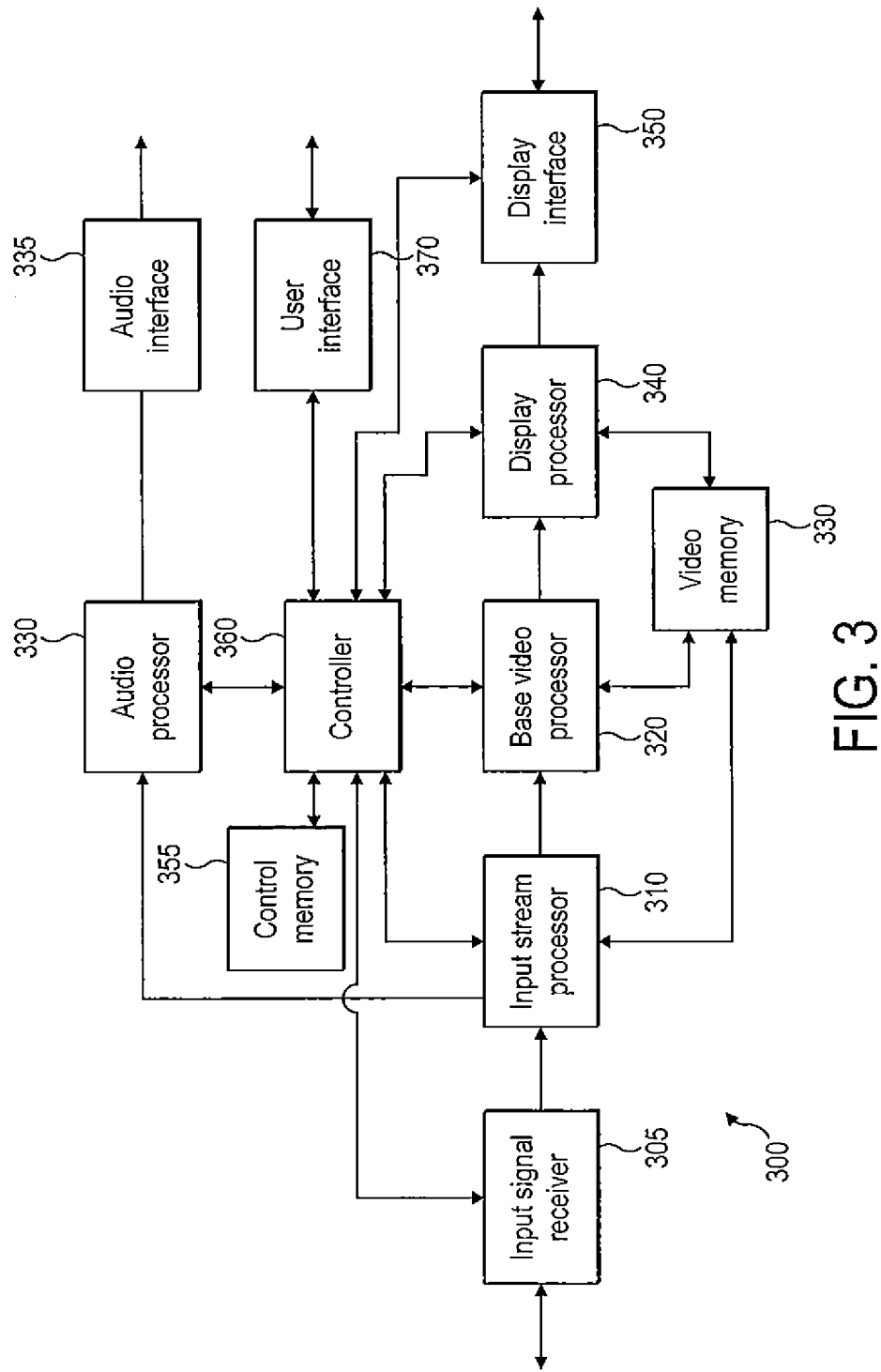
FIG. 3 is a block diagram of an embodiment of a signal receiving device of the present disclosure.

Turning now to FIG. 3, a block diagram of an embodiment of a signal receiving device 300 is shown. Signal receiving device 300 may typically be used for receiving signals containing content delivered over one or more delivery networks, such as those described in FIG. 1 or FIG. 2 or alternately from a local source such as local content source 180 described in FIG. 1 or local content source 280 described in FIG. 2. Signal receiving device 300 may be incorporated into a settop box, such as settop box 160 shown in FIG. 1 or may alternatively be incorporated into other devices including a display device, such as display device 170 shown in FIG. 1. All, or a portion of, signal receiving device 300 may also be incorporated into gateway head end device 255 or client devices 265a-265n. In either case, several components necessary for complete operation of signal receiving device 300, such as the power supply and various control signals, are not shown in the interest of conciseness as they are well known to those skilled in the art.

In signal receiving device 300, a signal containing video as well as audio content is received in input signal receiver 305. Input receiver 305 connects to input stream processor 310. Input stream processor 310 connects to audio processor 330. Audio processor 330 connects to audio interface 335. Audio interface 335 provides an audio output signal for external use in an external device, such as an audio amplifier and speaker. Input stream processor 310 also connects to base video processor 320. Base video processor 320 connects to display processor 340. Display processor 340 connects to display interface 350. Display interface 350 provides an output video signal and may additionally provide a communications interface with an external display element or device. It is important to note that the audio output signal and video output signal may be combined into a composite output interface, such as HDMI. A video memory 355 connects and interfaces to input stream processor 310, base video processor 320, and display processor 340. A controller 360 is connected to input signal receiver 305, input stream processor 310, base video processor 320, audio processor 330, display processor 340, and display interface 350. A control memory 365 connects to controller 360. Controller 360 also connects to user interface 370. User interface 370 includes any structures and devices necessary to allow interactive control of signal receiving device 300 by a user or viewer.

Input signal receiver 305 may receive a signal containing one or more audio and video programs as either a broadcast signal delivered over delivery network 140, a broadband signal delivered over delivery network 150 or provided locally by a local content source 180 as shown in FIG. 1 or similarly described in FIG. 2. Input signal receiver 305 may include one or more of several known receiver or transceiver circuits used for receiving, demodulation, and decoding signals provided over one of the several possible networks including, but not limited to, cable, satellite, over the air, Ethernet, fiber and phone line networks as well as physical media. The desired input signal may be selected, or tuned, and decoded in input signal receiver 305 based on a control signal from controller 360. Alternately, the input signal receiver 305 may receive the signal from local content source. Controller 360 may generate the control signal based on a user input provided through user interface 370.

The decoded output signal from the input receiver 305 is provided to input stream processor 310. Input stream processor 310 performs the final signal content selection and processing and includes separation of video content from audio content within the decoded signal content stream. The audio content is provided to audio processor 330 for conversion from the received format, such as a compressed digital signal, to an analog or digital waveform signal. The analog or digital waveform signal is provided to audio interface 335 and further to a display device or audio amplifier. Alternatively, audio interface 335 may provide a digital signal to an audio output device or display device using a high definition multimedia interface (HDMI) cable or alternate digital audio interface such as via Sony/Philips Digital Interconnect Format (S/PDIF).

The video signal content from input stream processor 310 is provided to base video processor 320. The video signal content may be provided in one of several formats, including traditionally compressed 2-D, 3-D checkerboard, over/under, line interleaved, quincunx, side-by-side format, or temporally interleaved, proprietary 3-D formats such as Sensio, or other formats such as MVC or SVC. In addition, the signal content may be provided at a particular frame rate, such as 2.4 fps or 30 fps. The signal may also be provided at a particular display resolution format, such as 720 line interlaced (720i) or 1080 line progressive (1080p). Base video processor 320 provides a first conversion of the video content into a base or intermediate form as may be necessary based on the input signal format and one or more display device characteristics. Several base forms may be possible and multiple base forms may also be generated, either simultaneously or successively. One possible base form, chosen for allowing ease of further conversion, is a left-right stereoscopic format base form. The left-right stereoscopic format includes two separate images based on an image for the left eye and another image for the right eye. It is important to note that the left-right stereoscopic format permits conversion between various 3-D formats for the input signal into other various 3-D formats for the display device. Further, the left-right stereoscopic format permits conversion of a 2-D input format to a 3-D output as well as a 3-D input format to a 2-D or 3-D output for use with a 2-D display. The left-right stereoscopic format also permits conversion of multi-view input formats into signal formats for either 2-D or 3-D display devices and vice versa.

The base form conversion process in base video processor 320 may be controlled based on inputs received from controller 360. The base form conversion process will be described in further detail below. Following any necessary first, or base form, conversion in base video processor 320, the base form signal, including either a single base form or multiple base forms, may be stored in video memory 330. Alternatively, the base form signal may be provided directly to display processor 340. Providing the base form signal directly to display processor 340 rather than to video memory 330 may depend on the complexity of the conversion or information from the received input signal and identified, determined, and controlled by controller 360.

The base form signal from either base video processor 320 or video memory 330 is provided to display processor 340. Display processor 340 converts, as necessary, one or more of the base forms in the base form signal into a display signal that is display device appropriate or display device optimized. Display processor 340 converts the base form signal to the display signal based on inputs received from controller 360 and may represent a separate conversion process from the conversion process performed in base video processor 320. The display signal conversion process will be described in further detail below. The output display signal from display processor 340 is provided to display interface 350. Display interface 350 further provides the display signal to a display device such as a type of display device described above. Display interface 350 may include an analog signal interface such as red-green-blue (RGB) interface or may include a digital interface such as HDMI.

Controller 360 is interconnected to, and provides control inter-operation with, several of the blocks in signal receiving device 300 including the input stream processor 310, base video processor 320, display processor 340, display interface 350, and user interface 370. Controller 360 manages the two stage conversion process for converting the input stream signal into an appropriate or optimized display signal. Controller 360 may receive several inputs in order to determine and manage the necessary conversion processes. First, controller 360 may receive information regarding the input signal format from input stream processor 310. The information may be provided as part of the signal, such as data in a header packet. The information may also be provided as a separate information stream associated with the content stream in the received signal. The input signal format information may be also be determined directly by signal analysis in input stream processor 310, by a user and provided as a user input through user interface 370, or by some other predetermined fashion.

Controller 360 may additionally receive information regarding the capability of the display device from display interface 350, from the user through user interface 370, or as part of a received input signal through input stream processor 310. For instance, the display device may be identified using information received over the HDMI two way communications at display interface 350. The HDMI communications may also provide display capabilities, and may also include optimal settings for the display. Additionally, after identification over HDMI or by the user, controller 360 may send a request out of the signal receiving device through input signal receiver and over a delivery network to a database service. The database may contain further information associated with the particular identified display device, including the optimal 3-D signal format, resolution, and technology capabilities. The database may also identify particular characteristics or signal and display formats that may be considered more appropriate or optimal for displaying 3-D content. Control memory 365 may be used to store display information, input signal format information, and control and user information used in the display format conversion processing.

It is to be appreciated that video memory 355 and control memory 365, shown and described in FIG. 3, may be any conventional storage or memory device known in the art. Further, the implementation of the storage or memory may include several possible embodiments, such as a single memory device or, alternatively, more than one memory circuit connected together to form a shared or common memory. Still further, the memory may be included with other circuitry, such as portions of bus communications circuitry, in a larger circuit. Finally, the storage or memory may utilize any current storage technology suitable for storing data and/or instruction code including, but not limited to, static random access memory (SRAM), read only memory (ROM), and hard disk drive.

Controller 360 also provides control output signals to the input stream controller 310, base video processor 320, display processor 340, and display interface 350. Controller 360 may provide a signal to the input stream processor 310, base video processor 320, and display processor 330, to bypass any further processing of the incoming signal and/or to store any received signal content in its received form in video memory 355. This pass-through mode may be necessary or desirable based on the type of input signal, the type of display, or a user input. For instance, the pass-through mode may be necessary if the signal input and the display device utilize a proprietary, custom, or unknown 3-D signal format. Any further conversion of the incoming signal may only impair performance. Further, during pass-through mode, the controller 360 may provide additional information to the display processor 340 to add signaling to the output signal to the display interface 350 allowing automated signaling at the display device, such as display device 170 described in FIG. 1 or similar described in FIG. 2.

Controller 360 may also provide signals to base video processor 320 and display processor 340 to identify and perform the necessary conversion steps to be performed in each block based on inputs and information received by controller 360. For example, controller 360 may provide a control signal to base video processor 320 to convert the incoming input video stream from a 480i side-by-side 3-D signal to a 2 image left-right stereoscopic image at 1080p and 30 fps as a base form. Controller 360 may additionally provide a control signal to display processor 340 to generate a 2-D signal from the base form generated above. In one embodiment, display processor generates a 2-D signal from a 3-D base form as a 2 image left-right stereoscopic image by maintaining the left eye image and deleting or discarding the right eye image. Further detail related to the conversion processes will be described below.

Figure 4:
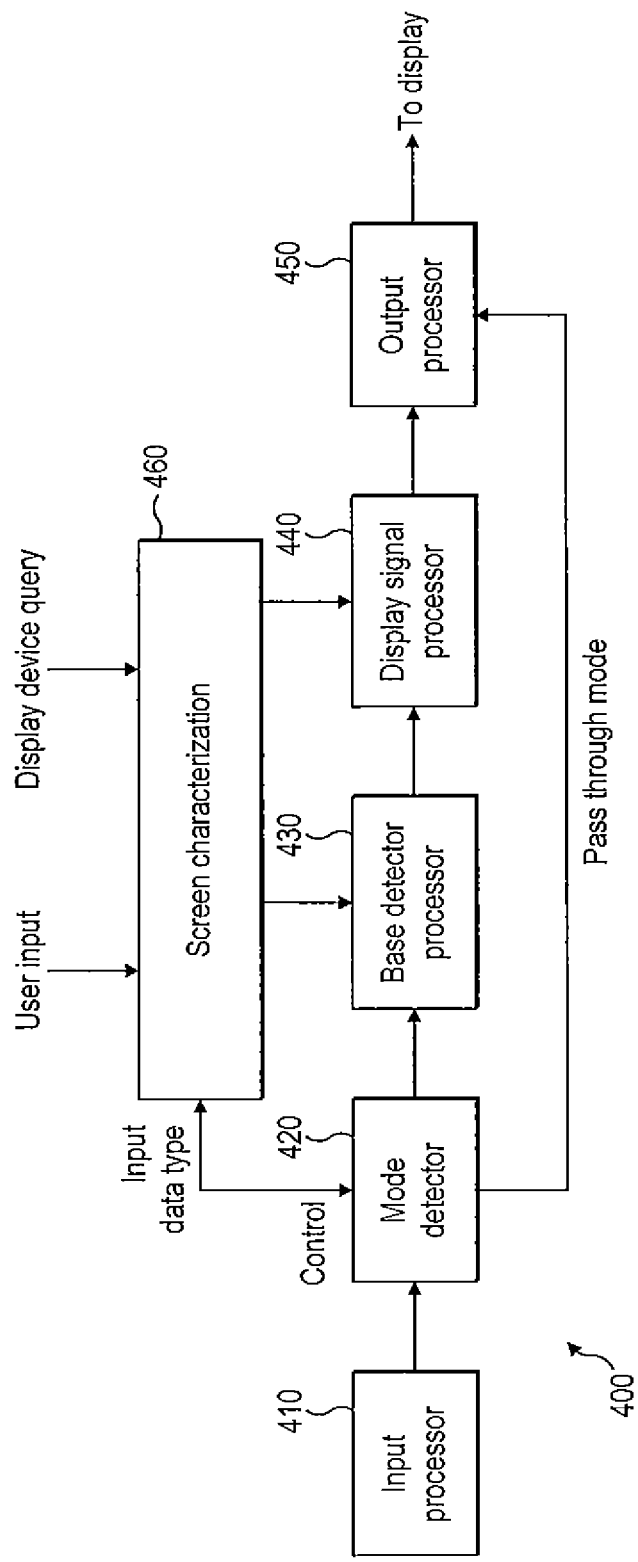
FIG. 4 is a block diagram of an embodiment of a display signal converter used in a signal receiving device of the present disclosure.

Turning now to FIG. 4, a block diagram of an embodiment of a display signal converter 400 using aspects of the present disclosure is shown. Display signal converter 400 is typically included as part of a signal receiving device, such as signal receiving device 300 described in FIG. 3, settop box 160 described in FIG. 1, or gateway head end device 255 and client devices 265a-265n described in FIG. 2. Additionally, all, or a portion, of the display signal converter 400 may be included in one or more of the blocks described in FIG. 3, such as input stream processor 310, base video processor 320, display signal processor 340, display interface 350, and controller 360. Display signal converter 400 includes some of the key elements used in a video display conversion process primarily for signals received in either a 2-D or 3-D signal format, converted into a base form, and then further converted into an appropriate or optimal display signal format for either a 2-D or 3-D display device. It is important to note that display signal converter 400 may be used for the video display conversion process for other signal formats and displays, including but not limited to 2-D formats for 3-D displays, 3-D formats for 2-D displays, as well as multi-view signal formats for multi-view displays and the like.

An input signal, containing video content in a video format is received by input processor 410. Input processor 410 is connected to mode detector 420. Mode detector 420 is connected to base decoder processor 430. Base decoder processor 430 is connected to display signal processor 440. Display signal processor 440 is connected to output processor 450. Output processor 450 may provide an optimal or suitable display signal using an optimal or suitable display format for a video display device, such as display device 170 described in FIG. 1 or similarly described in FIG. 2. Mode detector 420 is also connected to output processor 450 in order to permit a signal pass-through operation or mode. Screen characterization block 460 is connected to mode detector 420, base decoder processor 430, and display signal processor 440. Screen characterization block 460 also receives inputs from other circuits (not shown), including, but not limited to a user input through a user interface, such as user interface 470 in FIG. 3, and device query results processed in a controller, such as controller 360 in FIG. 3.

The input signal may be received at input processor 410 as a single or multiple program stream video signal using a number of different signal formats, including, but not limited to, 2-D, stereoscopic high definition or standard definition temporally interleaved (2× stream), side by side, over/under, checkerboard, Sensio, 2-D+depth (or disparity) map, MVC (main and offset stream), SVC (main and enhancement stream), and other forms of multi-view content including beyond stereoscopic image content. In addition, the input signal may include format information containing particular frame rate and display resolution characteristics. Following some initial processing in input processor 410, such as packet identification and signal timing and synchronization, mode detector 420 may determine the signal format. The signal format may be determined by decoding identification information in packet headers, separate signaling, a manual configuration set-up or by analysis based on the signal timing information. Mode detector 420 may provide the signal format property information to screen characterization block 460.

Screen characterization block 460 may operate to determine and manage the signal conversion process in either a static or dynamic manner in order to define the best possible 3-D or other video experience for the display to which the device is connected. In one embodiment, screen characterization block 460 receives inputs, provided as information related to querying the display device, and user preference inputs. In another embodiment, the display format and display device characteristics are predetermined or preselected based on user inputs. These display format and device inputs are used in the display screen characterization process to determine first, the most appropriate or optimal base form for the conversion, and second, the most appropriate or optimal display output format for the conversion. The information related to the base form and display format are provided to base decoder processor 430 to initially decode the incoming signal and to convert the signal into a base form signal.

It is important to note that the optimal display format may be characterized based on several characteristics or terms including, but not limited to, the 3-D format best suited or matched to the display, optimal resolution, progressive or interlaced scan, image depth, color gamut, and the like.

As mentioned above, several possible base forms may be used. For instance, an input signal in a 2-D format may be stored as a 2-D format, with no conversion necessary as part of the base form decode element. Similarly an input in a multi-view format may be stored as a similar multi-view format. It is important to note that input signal formats may be characterized as a 2-D single frame image signal, a 3-D single frame image signal (e.g. checkerboard, over/under, side-by-side, line-interleaved, temporally interleaved, quincunx, anaglyph, or 2-D plus depth (or disparity) map, a 3-D two frame stereoscopic image signal, or a multi-view multi-frame image signal. Further, all of the above formats may be accompanied by additional occlusions or other additional data. Any of these formats may also be used as a base form. In one embodiment, most 3-D input formats (e.g. over/under, side-by-side, checkerboard, line interleaved, temporally interleaved, quincunx, 2-D+depth, stereoscopic MVC, etc) may be converted to a left-right eye stereoscopic format, having 2 images in the signal.

In addition, display resolution up-conversion may be performed in base decoder processor 430, in order to make the base form the highest possible resolution signal. The re-scaling, or up-sampling, may use a resolution performance optimal algorithm that may not be reversible. However, based on inputs from the screen characterization block 460, a less than optimal but reversible re-scaling algorithm may be used in order to accommodate various display device screen resolution possibilities. If the input format is deemed to also be the optimal output format, then no conversion of any form need take place and the mode detector 420 may be switched to provide the input signal content as is to the output processor 450.

Base decoder processor 430 may also produce an on-the-fly 2-D to 3-D conversion of a received 2-D image format signal to create left and right views in a left-right stereoscopic 3-D image base form signal. 2-D to 3-D conversion typically requires significant signal processing and may be added as an optional processing block in the base decoder processor 420. Information relating to 2-D to 3-D conversion will be described in further detail below. In a similar manner, the base decoder processor 430 may include a conversion for a 2-D input signal to a 2-D base form with different display characteristics, a multi-view input signal to either 2-D or 3-D image base form signal or a 2-D or 3-D to multi-view image base form signal.

Once a base form video signal is created through the base decoder processor 430, the display signal processor 440 uses a second conversion process to provide an appropriate or optimal video display output signal for a display device. The information related to the display format, such information from screen characterization block 460, is provided to the display signal processor 440 to convert the base form signal into a display signal. Based on results from a screen characterization performed in screen characterization block 460, conversion processing of one or more base forms in the base form signal may be identified. These conversion steps may include converting from the base form (e.g. 2 image left-right stereoscopic format) to a single frame 3-D format (e.g. over/under, side-by-side, checkerboard) and may also include any display resolution or frame rate re-scaling that may be necessary for the display device. In addition, display signal processor 440 may include the conversion of a base form 3-D image into a 2-D image format signal for display on a conventional, or legacy, 2-D display device. In one embodiment, the conversion may include a left eye only view for display on the legacy display device. Further, display signal processor 440 may produce an on-the-fly display format signal to create a 3-D effect on a legacy 2-D display device. One popular technique includes an Anaglyph video processing of the 3-D video signal which would be created or generated on-the-fly. 3-D effect type video processing will be described in further detail below.

Display signal processor 440 may also include display resolution and frame rate conversion. As described above, the base form signal typically includes a base form that includes the highest possible resolution format and/or frame rate. Display signal processor 440 receives inputs through screen characterization block 460 that identifies the required display resolution and frame rate for the display device. Display signal processor 440 converts the base form signal to the required resolution and frame rate, including, if necessary, conversion from progressive scan to interlaced scan. Display signal processor 440 may use an optimal or a sub-optimal resolution conversion process depending on the identified input signal format, base form, and display device characteristics. Display signal processor 440 may include mechanisms to dynamically alter 3-D depth, color gamut or other parameters as required, in addition to, or in place of, the display resolution and frame rate conversion processing. Display signal processor 440 may also include processing for 3-D to 2-D down-conversion, as well as multi-view to 2-D or 3-D down-conversion.

The converted display signal from display signal processor 440 is provided to output processor 450. Output processor 450 interfaces with the external display device in order make sure the output display signal is delivered to the display device. As described earlier, the output display signal may be in a 2-D format, a 3-D format as either a single frame or multi-frame format, or multi-view format. In one embodiment, output processor 450 may provide 2-D signals over an analog RGB interface in a standard 2-D format or in an anaglyph 3-D format to a 2-D display device (e.g. CRT, LCD, DLP, OLED). The anaglyph 3-D format may then be viewed using colorized lens glasses. In another embodiment, output processor 450 may provide single frame 3-D signals to a 3-D display device (e.g. LCD, DLP, OLED) over HDMI in side by side, over/under, line interleaved, temporally interleaved, checkerboard, quincunx, or other signal format. In most cases these single frame 3-D formats are processed to produce separate left-right images on the display device and are viewed using synchronized shutter lens glasses or polarized glasses. The single frame 3-D formats may also be displayed on an auto-stereoscopic display without glasses. Output processor 450 may also provide a dual stream 3-D signal that may include stereoscopic left and right eye views or may include signals with 2-D content and a depth or disparity map. Finally, output processor 450 may provide a multi-view signal over one or more digital video interfaces for display on an auto-stereoscopic or other display requiring greater than two views.

In addition to the conversion steps described, mode detector 420 also permits a signal pass through mode. In some instances, the conversion process may be undesirable or unnecessary and the input signal may simply be passed to the output for the display device. One possible use for a pass-through mode is a situation where the input signal format matches the most appropriate or optimal properties of the display device. For example, the input signal may be a 1080p checkerboard 3-D signal, and the display device may be a 1080p 3-D DLP display accepting checkerboard signals and utilizing polarized glasses technology. As a result, any processing or conversion would likely only be detrimental. The pass through mode may be controlled and invoked based on signal format and/or display device detection, or may be controlled and invoked based on user input. In another embodiment, the pass through mode may be used when the input signal is in a form that is not decodable by base decoder processor 430, and may be passed directly to the output processor 450 and to the display device for further signal decoding and display. One such example may be for future multi-view formats that don't exist today, but may be both supported by screens or display devices, as well as transmitted, in the future. The process may be similar to the introduction of digital theater systems (DTS) sound for the DVD, where players may not necessarily decode the stream, but may pass the stream through directly to a receiving device.

It should be understood that one aspect of the conversion circuitry described in FIG. 4 is the flexibility of extending the process to multi-view signals and systems. For instance, a similar process may be used to receive a signal as a 3-D signal, convert to a base form (e.g. left-right eye stereoscopic format), and process the base form to generate multiple views suitable for use on multi-view auto-stereoscopic display that could, for example, require significantly more than two views. Additionally, a similar process may be used to receive a signal in a multi-view signal format with greater than two views, convert the signal to a base format suitable for stereoscopic 3-D viewing (e.g. left-right eye format) then process the base form to generate a signal (e.g. a checkerboard 1080p signal) for use on a 3-D DLP display. The same multi-view input signal may also be converted to generate a 1080p 2-D signal for use on a legacy high definition television device.

As described above, another aspect of the conversion circuitry described in FIG. 4 is the capability to perform on-the-fly conversion from a 2-D source to a 3-D or multi-view source with greater than two views. In this instance, an additional step would be required in the processing to generate a 3-D or multi-view base form from the 2-D content. There are a number of known mechanisms for achieving this, and on-the-fly 2-D to 3-D conversion capability exists in some 3-D TVs in the market today.

Also as described above, the display signal processor 440 may support creating 3-D content for use on existing 2-D displays. One popular technique for this is the anaglyph technique. The anaglyph technique is one type of stereogram imaging technique and has remained popular for video content presentation due to its low cost and compatibility with existing equipment. The anaglyph technique involves creating two images that are made up of two different color layers that are superimposed at a slight offset. The resultant video signal is displayed on the 2-D display but viewed through a set of anaglyph filter glasses, with each eyepiece using a different colored filter. As a result, each eye sees an apparently different image resulting in the creation of depth in the image. The quality of the 3-D effect may be improved by further processing the image based on specific image parameters such as contrast in the images, presence of shadows, and varying offset distance for the objects in the image.

Several other techniques may be used to create a 3-D image from a 2-2-D image. For instance, a particularly useful approach, that may replace or augment the approach discussed above, involves determining the depth of an object in the image by using a series of frames of image content. Such an approach is particularly useful for video content and allows the depth of the image to be determined using cues provided by the change of position of the image or shadows around the image across several frames of video. The display processor 340 described in FIG. 3, as well as the base decoder processor 430, or similar signal processing element may be capable of converting a 2-D image using either of these techniques described here, or others, including combinations of the techniques to generate 2-D to 3-D on the fly conversion.

The conversion process described for base decoder processor 430 may also include decompression and decoding of the image information in a frame of the video signal. The decompression and decoding steps may include the steps necessary to process a signal in the format established under the Motion Picture Entertainment Group (MPEG) standard MPEG-4, and included under MVC. The standard currently supports 3-D through a compression algorithm applied to both left eye and right eye view and sent as primary and secondary views. The standard also supports 3-D graphics menu navigation and subtitle or graphic overlay positioning within the 3-D video. The conversion process may convert an input signal in an MVC format to a base form in a two image left-right stereoscopic pair image format by decompressing and decoding the signal and, if necessary re-scaling the resolution of the signal. The conversion process may also convert a base form two image left-right stereoscopic pair image to an MVC format display signal by encoding and compressing the base form into a two image MVC format signal prior to providing the signal to the display device.

In addition to converting the incoming video signal to an appropriate or optimal format display output signal, the base decoder processor 430 and display signal processor 440 in FIG. 4 or similarly, base video processor 320 and display processor 340 in FIG. 3 may include the capability to process subtitles and graphics overlays in either 2-D or 3-D. In general, if the subtitle or graphic information is provided as part of the input stream, then the input stream processing (e.g. mode detector 420 in FIG. 4 or input stream processor 310 in FIG. 3) identifies the subtitle information, and provides the information to a memory (e.g. video memory 355 in FIG. 3) for eventual reincorporation with the display output signal (e.g. in the display signal processor 440 of FIG. 4, or display processor 340 of FIG. 3). In this way, the subtitle or graphics information is not altered as part of the base form processing in either base decoder processor 430 in FIG. 4 or base video processor 330 in FIG. 3, and is not subject to an undesired repositioning, or elimination during the conversion process. It is important to note that the same mechanisms for subtitle or graphic information apply for any graphics or user interface elements generated on the local device. These elements can be created in a normal 2-D form and provide to the output processor 450 to be formatted to match the output format to the display. In this way, even if the video is being passed through, the graphic overlays can be appropriately formatted to match the required output format.

Figure 5:
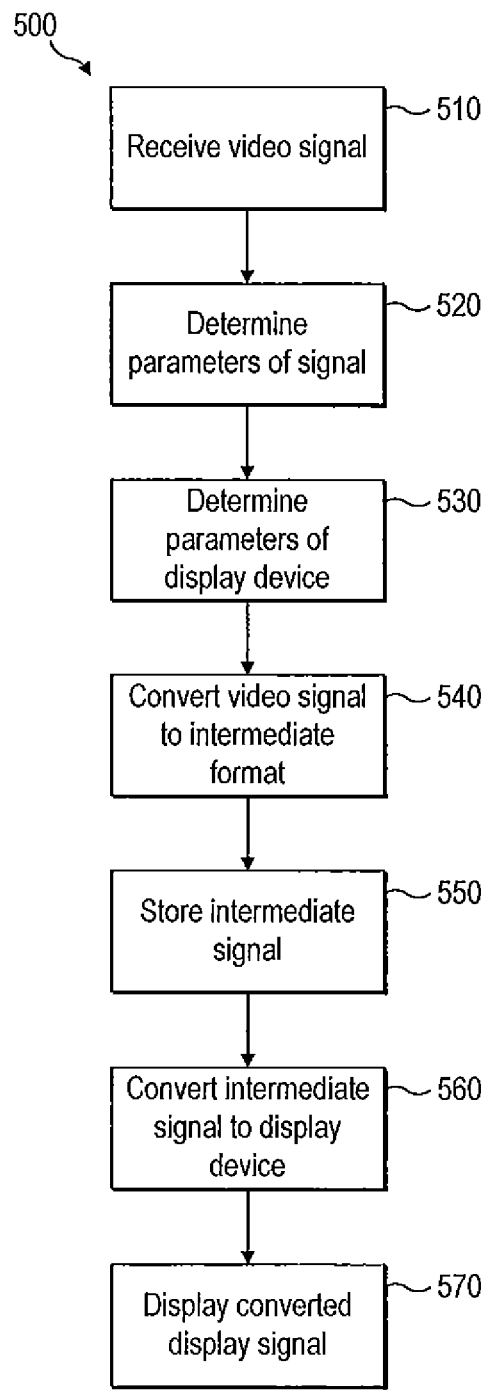
FIG. 5 is a flow chart of an embodiment of a signal conversion process of the present disclosure.

Turning now to FIG. 5, a flow chart illustrating a process 500 for signal conversion of a received signal into an appropriate video display signal according to certain aspects of the present disclosure is shown. For purposes of example and explanation, the steps of process 500 will be described primarily with reference to signal receiving device 300 in FIG. 3. The steps of process 500 may similarly be carried out as part of a process associated with a signal converter circuit, such as display signal converter 400 described in FIG. 4. The steps of process 500 may also be included in the operation of a signal receiver, such as settop box 160 described in FIG. 1 or gateway head end device 255 and client devices 265*a*-265*n* described in FIG. 2. The steps of process 500 are exemplary only, and are not intended to limit the present disclosure in any manner.

At step 510, a signal, including video content, such as content in the form of one or more video programs or streams, is received. Step 510 may be carried out in input signal receiver 305 or further in input stream processor 310 and may include tuning, demodulating, decoding, or separating the video content or video streams in the received input signal. Next, at step 520, one or more parameters associated with, or related to, the received video signal are determined. The determination in step 520 may be carried out in input stream processor 310 as well as in controller 360. Step 520 may include detecting parameters associated with the received signal, such as the signal format, signal scan resolution, or any of the other parameters described earlier. The parameters may be determined in step 520 as part of the input signal reception, other external inputs, or may be part of a user determination through a user interface.

Next, at step 530, one or more parameters associated with, or related to, the display device and its display modes and inputs are determined. The determination in step 530 may be carried out in display interface 350 as well as in controller 360. Step 530 may include detecting parameters associated with the display device, such as the display input format, display output mode or technology, display scan type and resolution, screen size used for appropriate depth or disparity mapping of 3-D material, or any of the other parameters described earlier. The parameters determined in step 530 may be detected as part of the input signal reception, part of the display interface communications, part of other external means such as a database lookup, or may be part of a user determination through a user interface.

At step 540, based on the one or more parameters determined in step 520 and the one or more parameters determined in step 530, the received input signal is converted from an original received format to a first, intermediate, or base form format signal. The base form format may be a 2-D format, a 3-D format, or a multi-view format and is primarily chosen to facilitate a further conversion based on the display parameters determined in step 530.

As described above, a left-right stereoscopic format base form may be chosen for allowing ease of further conversion between various formats. For instance, the left-right stereoscopic format permits conversion between various 3-D formats for the input signal into other various 3-D formats for the display device. Further, the left-right stereoscopic format permits conversion of a 2-D input format to a 3-D output as well as a 3-D input format to a 2-D or 3-D output for use with a 2-D display. The left-right stereoscopic format also permits conversion of multi-view input formats into signal formats for either 2-D or 3-D display devices and vice versa.

The conversion at step 540 is primarily carried out in base video processor 320. It is important to note that in some cases no conversion in step 540 may be carried out and the base form may be the same as the received signal. Additionally, the conversion at step 540 may include the conversion to more than one base form. The conversion at step 540 may also include any additional scan or resolution conversion processing and 2-D to 3-D conversion processing as described earlier. Further details of the base form conversion process will be described below.

Next, at step 550, the intermediate or base form signal, including one or a plurality of base forms from the conversion at step 540, is stored. The storage of the signal may be carried out in video memory 355. It is important to note that video memory 355 may include a single memory device or may include multiple memory devices coupled together to operate in unison. Video memory 355 may include a static or dynamic memory and may also include a hard disk drive or other optical or electrical storage capability.

At step 560, based on the one or more parameters determined in step 530, the intermediate or base form signal is retrieved, or otherwise received, and converted from a base form format to a display signal format. The display signal format may be a 2-D format, a 3-D format, or a multi-view format and is primarily chosen to provide an optimal output display signal for the display device. The conversion at step 560 is primarily carried out in display processor 340.

It is important to note that in some cases no conversion in step 560 may be carried out and the display signal format may be the same as the received signal, resulting in a pass through operating mode. The conversion at step 560 may also include any additional scan or resolution conversion processing as described earlier. The conversion at step 560 may further include 2-D to 3-D, 3-D to 2-D, or multi-view conversion processing as described earlier. Further details of the display signal conversion process will be described below. At step 570, the display signal resulting from a first conversion from the received signal format to an intermediate or base form signal format and from an intermediate or base form signal format to an appropriate, optimal, or desired display signal format is provided to the display device for display.

Figure 6:
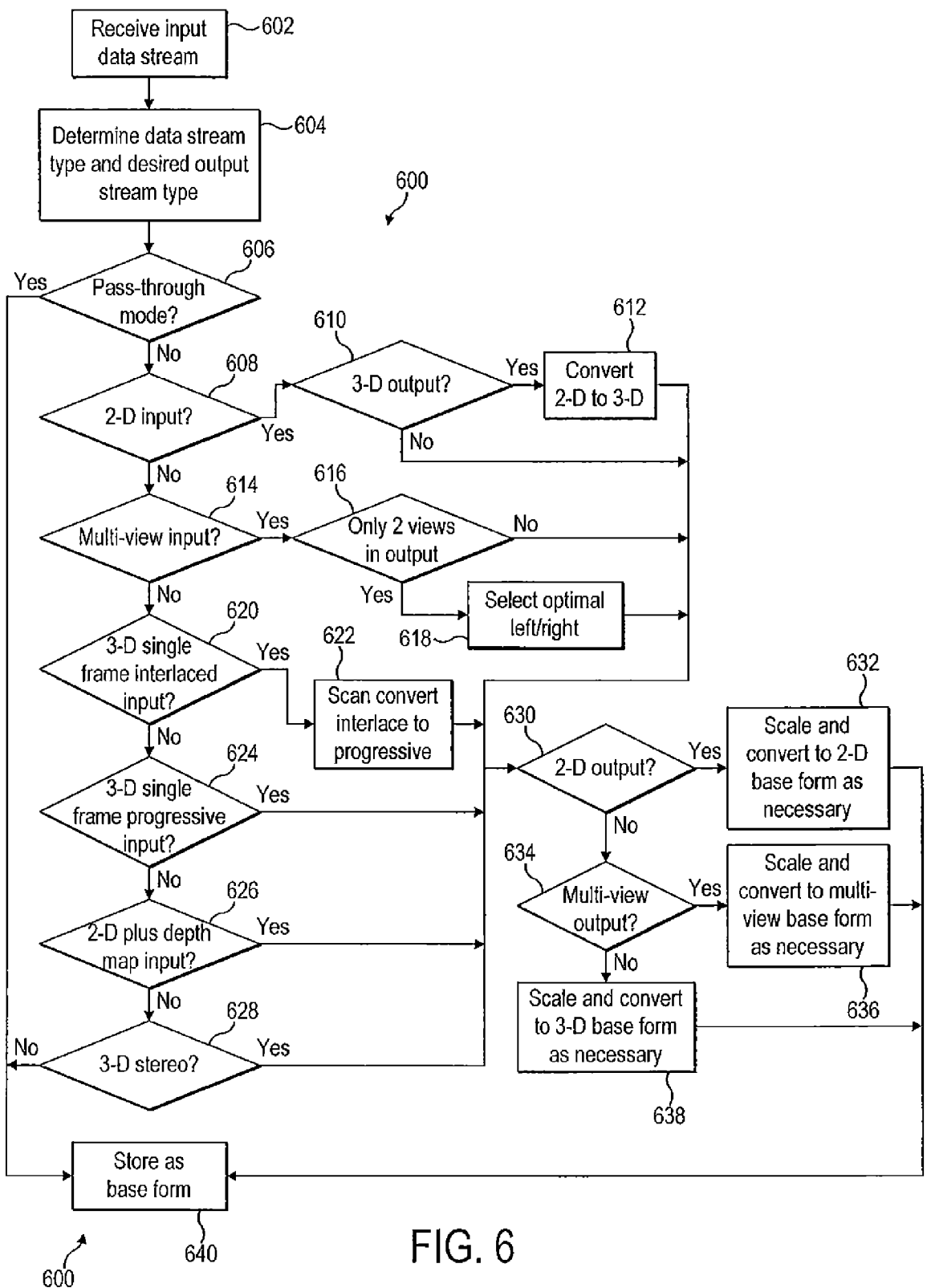
FIG. 6 is a flow chart of an embodiment of a base form or intermediate signal conversion process of the present disclosure.

Turning now to FIG. 6, a flow chart of a base form or intermediate signal conversion process 600 for a video signal according to aspects of the present disclosure is shown. Process 600 involves taking the received video stream or program in the input form received and converting it to a neutral format available for further conversion to the required, desired, or optimal output format. The steps in process 600 are generally carried out as part of the base form conversion process described at step 540 in FIG. 5. The steps in process 600 may be primarily carried out in a signal conversion device such as base video processor 320 in FIG. 3 or base form decoder processor 420 in FIG. 4. Additionally, some of the steps may be carried out in other blocks, such as the controller 360 in FIG. 3 or screen characterization block 460 in FIG. 4.

Process 600 includes a series of determination steps in order to identify and provide the most appropriate base form conversion of the input signal for use in a subsequent display signal conversion based on the received input signal format type and the optimal output video signal format type for the display device. It is important to note that not all steps may necessarily be carried out and certain steps may be omitted or combined based on a particular embodiment as well as the performance parameters of the process, the signal receiving device, or the display device.

First, at step 602, an incoming video signal stream or program is received. Next, at step 604, the parameters associated with the input signal as well as the parameters associated with the display device are determined and retrieved. At step 606, a determination is made as to whether a pass through mode is used. If, at step 606, a pass through mode is used, then the input stream type and output stream type match and there is no need to process the stream. The process proceeds to step 640, where the incoming video signal stream may be passed through or stored. As described above, pass-through mode bypasses the conversion process and stores, or establishes the input signal format as the base form.

If, at step 606, pass through mode is not utilized, then a series of determinations follow based on the determination of the signal format and display device. Certain steps, such as steps 608, 614, 620, 622, and 626 relate to the parameters for the input signal format while other steps, such as steps 610, 616, 630, and 634 relate primarily to the parameters associated with the display device output. At step 608, a determination is made as to whether the input is a 2-D signal input. If, at step 608, the input format of the stream is in 2-D only, then at step 610, a further determination is made as to whether a 3-D output mode may be desired. If at step 610, a 3-D output mode is desired, then at step 612, the signal is converted from 2-D to 3-D prior to any further base form conversion. The conversion of 2-D to 3-D may be carried out in several possible manners including one of the processes described earlier. It is important to note that the signal format following the 2-D to 3-D conversion may be two image stereoscopic (L/R Eye) format or a multi-view format. The process proceeds, after step 612, to step 630, described below. If, at step 610, a 3-D output is not desired, the process continues directly to step 630.

If, at step 608, the input signal is not a 2-D format, then, at step 614, a determination is made as to whether the input signal is a multi-view signal format input. If, at step 614, the input format is a multi-view (i.e. >2 views) format, then at step 616, a further determination is made as to whether more than two views may be desired as an output. If, at step 614, only two views are desired, for instance, as part of a desired or optimal 3-D display, then, at step 618, an appropriate left-right view set is chosen from the multiple views present in the received signal. The process proceeds, after step 618, to step 630, described below. If, at step 616, a 3-D output is not desired, the process continues directly to step 630.

If, at step 614, the input signal is not a multi-view format, then, at step 620, a determination is made as to whether the input is a 3-D signal input provided in a single frame interlaced scan format. If, at step 620, the received signal is in an interlaced 3-D format, then at step 622, the signal may be scan converted or de-interlaced to create a progressive scan 3-D format signal before further processing. It is important to note that if the original input signal was provided in an anaglyph input format, additional processing is likely needed in step 638, described below, to reverse the anaglyph process and generate the best possible quality 3-D stereoscopic image. The process proceeds, after step 622, to step 630, described below.

If, at step 620, the input signal is not a 3-D single frame interlaced signal, then, at step 624, a determination is made as to whether the input is a 3-D signal input provided in a progressive frame scan format. If, at step 624, the input format is a 3-D non-interlaced, or progressive, scan single frame format (e.g. checkerboard, side by side, over/under, or anaglyph), the input signal may then pass to step 630 for further processing to create a base form format signal optimal for generating the required output format. As described above for an interlaced input signal at step 620, if the original signal was provided in an Anaglyph input format, additional processing is likely needed in step 638 to reverse the anaglyph process and generate the best possible quality 3-D stereoscopic image.

As described above, during process 600, content may be de-interlaced, converted, and/or up-sampled/re-scaled, in order to create the highest possible quality progressive scan signal as required. The resolution re-scaling may be optimal, or suboptimal and reversible. It is important to note that a scan conversion, or de-interlacing, step is shown with respect to a single frame 3-D image signal, such as checkerboard, over/under, side-by-side, or anaglyph format signal. Although not explicitly shown, this scan conversion step may also be used in conjunction with processing either 2-D or multi-view format input signals.

It is important to note that resolution conversion and re-scaling is necessary particularly for single frame 3-D formats, such as over/under, side-by-side, line interleaved, or checkerboard formats, and additionally for anaglyph formats if required. Each of these formats may start with a reduced resolution in either the vertical or horizontal direction or in color resolution in order to squeeze the two images into a single frame video content. The resolution conversion and re-scaling allows for the creation, storage, and use of the cleanest base form (e.g left-right eye stereoscopic 3-D image base form) possible. In these cases, information related to the capabilities of the input format for the display device is also important in determining the proper conversion steps to base form. For instance, a fully or partially reversible resolution re-scaling may be used to convert an over/under input signal format for display on a higher resolution television also requiring an over/under signal format for 3-D display.

If, at step 624, the input signal is not a 3-D progressive format signal, then, at step 626, a determination is made as to whether the input is in the form of a 2-D image signal including additional depth or disparity map information. If, at step 626, the format includes 2-D image data plus the depth or disparity map, then the process proceeds to step 630 in a manner similar to that described above. At step 630, a determination is made as to the type of output format desired. If, at step 630, any form of 3-D rendering, creation, or generation is desired, appropriate, or optimal, then the 2-D plus depth or disparity map format is decoded, at step 638, to a 3-D stereo form. It is important to note that the depth or disparity information may also be stored as the base form, in order to allow for an alternate conversion process to a 3-D output type signal for display on a 2-D display using anaglyph or other conversion processing.

If, at step 626, the input signal is not a 2-D format including a depth or disparity map, then, at step 628, a determination is made as to whether the input is in the form of a 3-D stereoscopic image signal. If, at step 628, the format includes a 3-D stereoscopic image, no further processing is necessary and the process proceeds to step 630 for the additional determination steps associated with the output display characteristics.

As described above, the display of 3-D content on a 2-D display requires additional processing to create the 3-D effect within the 2-D signal for the 2-D display. The processing may require identification of depth information, and the storage of the depth or disparity map in addition to the stereoscopic images as part of the base form may be more useful than the rendered stereoscopic images alone. If the input signal format is already a two image left-right stereoscopic format, then only a re-scaling is needed prior to storing as a base form, though for an anaglyph output, depth may need to be calculated as part of the processing. Finally, unless the input signal format is already providing a two image left-right stereoscopic format at the highest required resolution, frame rate, etc, then all other formats are first converted to a two image left-right stereoscopic format and re-scaled to the highest frame rate and resolution required by the display before storing as the base form.

If, at step 628 and after passing through all other determining steps, no affirmative identified determination is found, the input format is not a 3-D stereoscopic image format signal, then the input format is not identifiable or known. As with the pass-through mode described at step 606, the received data is passed directly and/or stored in its native received format at step 640.

Following the determination and processing outputs from steps 610, 612, 616, 618, 622, 624, 626, and 628, and as described above, at step 630 a further determination is made as to whether the display output mode is 2-D for display on a 2-D, 3-D or multi-view display. If, at step 630, the display output is a 2-D type format or mode, then, at step 632, the image is converted to a 2-D base form image as necessary. In addition, at step 632, the image may be scaled/up converted prior to storing as a base form at step 640.

If, at step 630, the display output is not 2-D, then another determination is made, at step 634, as to whether the display output is multi-view. If, at step 634, the display output is a multi-view format or mode, then, as in step 632, then at step 636, the signal is converted, if necessary, to a multi-view base format. In addition, at step 636, the signal may be scaled/up converted prior to storing as a base form at step 640.

If at step 634, the display is not multi-view (and it is also not 2-D from step 630), then, at step 638, the signal is converted, if necessary, to a 3-D base form format. As described above, an appropriate base form format is a stereoscopic left and right eye view signal format. As in step 632 and step 636, step 638 may include scaling/up converting the signal prior to storing as a base form at step 640 or passing on for additional processing and conversion.

It is important to note that certain steps in process 600 may not be necessary for some combinations of input signal format and display device output format. For instance, an input signal in a stereoscopic left and right image format may pass through at step 628 and also pass through steps 630, 634, and 638 to the storage step without any conversion or scaling. A similar situation may also occur for some 2-D and multi-view format input signals.

Process 600 may be modified to include several possible iterations that may result in the creation, storage, and provisioning of multiple base form format signals. The information regarding the stored and available base form formats may be fed back through the system to ensure that the most appropriate images are used in a later display format conversion process to create the desired, appropriate, or optimal video display output signal for the display device.

Figure 7:
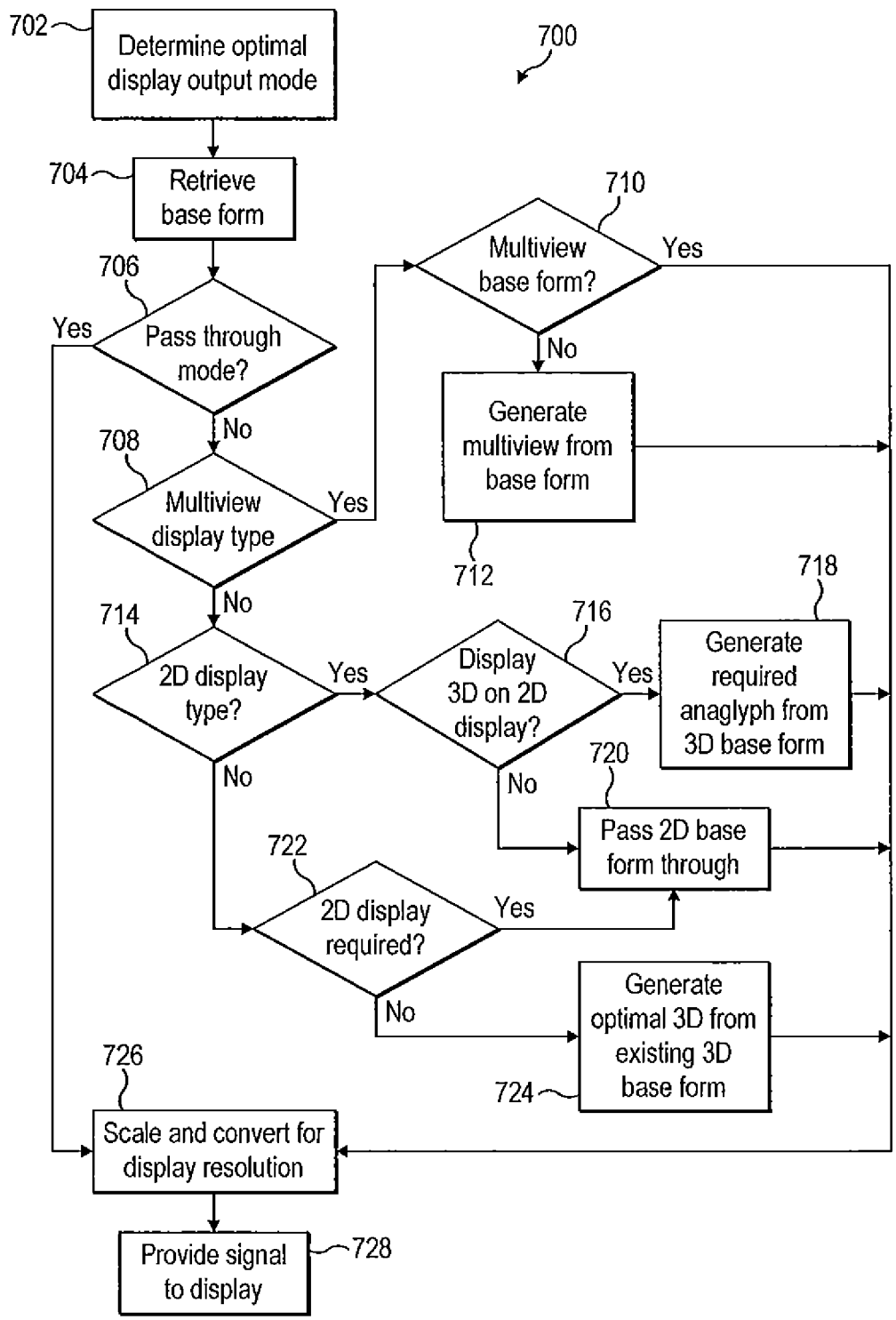
FIG. 7 is a flow chart of an embodiment of a display signal conversion process of the present disclosure.

Turning now to FIG. 7, a flow chart of an embodiment of a display format conversion process 700 according to aspects of the present disclosure is shown. Process 700 describes the conversion of the base form signal, as described in FIG. 6, into one or more desired or required output display signal formats. The steps in process 700 may be primarily carried out in a display processor, such as display processor 340 described in FIG. 3. The steps in process 700 may alternatively be carried out in display signal processor 440 and screen characterization block 460 in FIG. 4. Additionally, some of the steps may be carried out in other blocks, such as the controller 360 in FIG. 3 or screen characterization block 460 in FIG. 4.

Like process 600 described in FIG. 6, process 700 involves a series of decision steps based on a set of identified parameters or characteristics of the received signal and the display device in order to provide the most appropriate display format conversion for the signal that will be provided to the display device. Primarily, process 700 may involve identifying, determining, and retrieving the base form signal generated and, in some cases stored, as a result of process 600 before it is processed and provided to the display device. As with process 600, an unknown or unprocessed stream may be passed directly to the display device. If further processing is needed, such as changing the base form for a certain display mode or scaling and conversion, the processing may be done to generate the appropriate 2-D, 3-D or multi-view format signal.

Process 700 begins at step 702 with determining, identifying, and/or retrieving information associated with the display type and optimal output format mode for the display device. As described above, the determination may include determining the capabilities of the display device. Step 702 may further determine an appropriate display format. The determination may be, possibly user input driven, externally determined or conversion device driven. A conversion device driven determination may also result in an optimal display format. In addition, information related to the display mode or viewing technology (e.g. shutter lens, polarizer) may be determined.

Next, at step 704, based on the determination in step 702, the base form created in process 600 is retrieved or accessed. The base form may be a 2-D, 3-D, or multi-view format. For example, the base form may be a 3-D stereoscopic left eye and right eye format signal. It is important to note that the base form signal may contain more than one base form format. If multiple base forms are available and used, the determination steps in process 700 may select the needed base form from the multiple base form format signal.

At step 706, a determination is made as to whether pass-through mode will be used. If, at step 706, based on the determination that the signal format is a proprietary format or an unknown format, pass through mode is used, then the process proceeds to step 726, described further below.

If, at step 706, pass through mode is not used, then at step 708, a determination is made as to whether multi-view display type is desired. If, at step 708, a multi-view base form is desired, then at step 710, a further determination is made as to whether a multi-view base form was used or is available. If, at step 710, a multi-view base form is used or available, then the process continues as step 726. If, at step 710, a multi-view base form is not available, then at step 712, a multi-view display format signal is generated using a 3-D base form. It is important to note that standards for delivery of multi-view signals to displays are not yet established, and, as a result, additional processing may be required in order to adapt the available 3-D base form to support the delivery of the multi-view signal to the display. In one embodiment, additional up-sampling or processing of the signal as well identification and control signaling may be performed at step 712 before proceeding to step 726.

If, at step 708, a multi-view display type is not used, then, at step 714, a determination is made as to whether 2-D display type is used. In general, 2-D displays are well known and standardized and do not involve any unusual display signal format identification and configuration. If, at step 714, a 2-D display is used, then at step 716, a further determination is made as to whether a 3-D display mode is required on the 2-D display. If at step 716, a 3-D display mode is to be used, then at step 718, a 3-D conversion process is performed based on the 3-D base form available. As described above, the display of a 3-D image on a 2-D display involves a 3-D conversion process, such as an anaglyph process, typically involving the generation of a red/blue Anaglyph or colorcode anaglyph signal for display on a 2-D display device and viewed using colorized lens glasses.

If at step 716, a 3-D display mode is not used or required on a 2-D display, then at step 720, the 2-D base form created as a result of process 600 is passed through and the process continues at step 726. It is important to note that based on the stored or created base form from process 600, the appropriate 2-D base form may be generated from a 3-D base form. For example, if a left-right stereoscopic format is the base form that was stored, then the left image is selected as the 2-D image base form. Additionally, a 2-D image base form, with or without an additional depth or disparity map that is stored as a base form, may be used directly, with only the depth or disparity map information discarded.

If, at step 714, the display type is not 2-D display (and is not a multi-view display type from step 710), then a 3-D display type is used and at step 722, a further determination as to whether a 2-D display mode will be used on the 3-D display. If, at step 722, a 2-D display mode will be used, then at step 720, the 2-D base form is passed to step 726, as described above. If, at step 722, a 2-D display mode is not required, then, at step 724, the 3-D base form is used to generate an optimal or appropriate 3-D display signal for the display device. At step 724, the 3-D base form for the signal may be converted into an appropriate single frame display format (e.g. over/under, side-by-side, interleaved, or checkerboard format).

Next, at step 726, the retrieved and converted base form signal from step 706, step 710, step 712, step 718, step 720, or step 724 is scaled and converted for the proper or appropriate display device screen parameters and resolution. The scaling and conversion, such as image re-scaling for resolution or frame rate at step 726 may be necessary based on the differences between the base form and the desired display format. As was noted above, if a reversible (i.e. suboptimal) resolution scaling algorithm was used in process 600, the conversion should include the reverse resolution scaling process. Finally, at step 728, the scaled and converted signal, now in an appropriate display signal format, is provided to the display device.

It is important to note that process 6500 described in FIG. 6 and process 700 described in FIG. 7 may or may not be performed within the same device. For instance, process 600 may be included as part of a content generation device, such as local content source 180 described in FIG. 1 or similarly described in FIG. 2. Further, process 700 may be included as part of a display device such as display device 170 described in FIG. 1 or similarly described in FIG. 2. In this particular example, a separate settop box may not be necessary or included as part of the system. In another example, process 600 may also be included as part of gateway head end device 255 described in FIG. 2. Process 700 may be included as part of each of client devices 265*a*-265*n* described in FIG. 2.

As described above, one of the important aspects associated with the characterization and the operation of controller 360 described in FIG. 3 or screen characterization device 460 described in FIG. 4 relates to identifying available display modes for the display device, and also choosing the appropriate or optimal format for the signal to the display device. The operation involves first identifying what the display device is capable of. The operation may involve direct queries of the device over a communications bus such as an HDMI back channel. However, the information available or provided over HDMI may vary in degree of relevance, and may depend on the version of HDMI utilized. For instance, early HDMI standard devices may provide much less information related to the display resolution and capabilities than may be obtained from HDMI 1.4 or later. As an alternative, or as a complement, a user interface menu may be created. The user interface menu may first inquire as to the device model being used, and provide assistance in identification. The user may further be presented with a series of test patterns, utilizing various display formats and technologies as described above in order to determine the optimal settings for the display. The test patterns may be stored in a memory in the conversion device (e.g. settop box).

As part of the user interface menu as described here, the user may not only identify the capability of the display device, the user may also be able to select appropriate or optimal display formats. Based on these selections, the controller or screen characterization may further select the most appropriate base form for conversion of the input signal and display signal format for providing to the display device. As a result, the system can provide a seamless user friendly method to allow any type of display, including legacy type displays, to show advanced content, such as 3-D content, in the best manner possible.

The present embodiments describe a system and method for providing optimal display of video content. The embodiments are directed at identifying the format of an incoming video signal stream, converting the stream to a base format, and then processing the base format to generate a display signal suitable for a particular display device. In particular, the typical embodiments convert incoming 3-D content into a 2-image left-right stereoscopic image signal as a base 3-D form. The embodiments also perform additional processing necessary to handle both 2-D input signal video content and 2-D displays. The embodiments are flexible and easily extended to use in multi-view environment. The embodiments address the growing problems associated with delivering multiple formats of video content by including a conversion device between the received input signal and the display device. As a result, video content may be produced in any particular format chosen by the content provider and video content may still be effectively displayed on a broad range of display devices using various display technologies. In addition, the embodiments recognize a mechanism between the display and HDMI interface defining supported and preferred 3-D (or other) formats (if any), along with other mechanisms to automatically determine or look up optimal settings for a particular display, and a mechanism to manually define these aspects, or a combination thereof.

The present disclosure provides a mechanism to support a variety of display screens and display types with an optimally formatted display signal. Implementing the embodiments described above, including the signal processing and control blocks creates a flexible architecture for implementation. For instance, the embodiments may also be used to simultaneously support a range of existing and future display formats by storing either multiple base forms or multiple signal display formats that can further be combined or de-muxed to produce one or more image streams at the output. In this way, the described embodiments could generate an anaglyph on the fly from the stereo base format for one display device and/or generate a 120 Hz Interlaced 3-D format for another display device. Additionally, more efficient use of the communications bandwidth over the delivery networks described in FIG. 1 and FIG. 2 may be achieved by providing the 3-D content in as an efficient form as possible while ultimately delivering a full-resolution left-right stereoscopic image to the end device that supports it.

The disclosed embodiments are directed at a system and method for providing optimal display of video content. More specifically, the embodiments are directed at signal processing that detects or determines the supported and preferred 2-D, 3-D, or multi-view formats of a display device, along with the modes or technology available, and uses this information to process and convert the received 2-D, 3-D, or multi-view content such that the signal processor provides the content in format that is both appropriate and optimal for the display and the user's requirements.

While the embodiments may be susceptible to various modifications and alternative forms, specific embodiments have been shown by way of example in the drawings and have been described in detail herein. However, it should be understood that the disclosure is not intended to be limited to the particular forms disclosed. Rather, the disclosure is to cover all modifications, equivalents and alternatives falling within the scope of the disclosure as defined by the following appended claims.

The invention claimed is:

1. A method comprising:
  receiving a video signal in a first video signal format;
  determining at least one parameter associated with the first video signal format for the received video signal;
  determining at least one first parameter associated with a display device, the at least one first parameter used to identify the capabilities of the display device;
  converting the received video signal to an intermediate video signal in a second video format based on the at least one parameter associated with the first video signal and the at least one first parameter associated with the display device;
  storing the intermediate video signal in a memory for display on the display device at a later time;
  retrieving the intermediate video signal from the memory at the later time; and
  converting the retrieved intermediate video signal to a video display signal based on at least one second, different parameter associated with displaying the video display signal on the display device, the at least one second, different parameter identify a specific display type and display output mode for the display device.

2. The method of claim 1, further comprising providing the video display signal to the display device.

3. The method of claim 1 wherein the received video signal is a video signal having a first single frame format, the intermediate video signal is a pair of stereoscopic image signals representing a left eye view and a right eye view, and the video display signal is a video signal having a second signal frame format.

4. The method of claim 3 wherein the first single frame format and the second single frame format is at least one of over/under, checkerboard, line-interleaved, temporally interleaved, side by side, anaglyph, and quincunx.

5. The method of claim 1 wherein the received video signal is a single frame video signal and the display device is a 3-dimensional display device, and wherein converting the received video signal to an intermediate video signal includes converting the single frame video signal to an intermediate video signal including at least two image signals.

6. The method of claim 1 wherein the received video signal is a video signal including 2-dimensional video content and at least one of depth map content and disparity map content and the display device is a 2-dimensional display device, and wherein converting the intermediate video signal to a video display signal includes removing the at least one of depth map content and disparity map content from the video display signal.

7. The method of claim 1 wherein the received video signal is a 3-dimensional video signal and the display device is a 2-dimensional display device, and wherein converting the intermediate video signal to a video display signal includes converting the 3-dimensional video signal to an anaglyph video signal.

8. The method of claim 1 wherein the received video signal is a multi-view video signal and the display device is a 3-dimensional display device, and wherein converting the received video signal to an intermediate video signal includes selecting a left eye view signal and right eye view signal from the multi-view video signal.

9. The method of claim 1 wherein the received video signal is a 2-dimensional video signal and the display device is a 2-dimensional display device, and wherein converting the received video signal to an intermediate video signal includes converting the 2-dimensional video signal to a stereoscopic 3-dimensional signal and converting the intermediate video signal to a video display signal includes the step of converting the stereoscopic 3-dimensional signal to an anaglyph video signal.

10. The method of claim 1, further comprising:
  displaying a test pattern on the display device; and
  requesting a response from a viewer based on the test pattern to determine the at least one second parameter of the display device.

11. The method of claim 1, wherein the received video signal is a 2-dimensional video signal and the display device is a 3-dimensional display device, and wherein converting the received video signal to an intermediate video signal includes converting the 2-dimensional video signal to a pair of stereoscopic image signals.

12. The method of claim 1, wherein the received input video signal is at least one of a 2-dimensional video content signal and a 3-dimensional video content signal and the display device is a multi-view display device, and wherein converting the intermediate video signal to a video display signal includes generating a multi-view video signal.

13. An apparatus comprising:
  means for receiving a video signal in a first video signal format;
  means for determining at least one parameter associated with the first video signal format for the received video signal;
  means for determining at least one first parameter associated with a display device, the at least one first parameter used to identify the capabilities of the display device;
  means for converting the received video signal to an intermediate video signal in a second video format based on the at least one parameter associated with the first video signal and the at least one first parameter associated with the display device;
  means for storing the intermediate video signal in a memory for display on the display device at a later time;
  means for retrieving the intermediate video signal from the memory at the later time; and
  means for converting the retrieved intermediate video signal to a video display signal based on at least one second, different parameter associated with displaying the video display signal on the display device, the at least one second, different parameter identifying a specific display type and display output mode for the display device.

14. The apparatus of claim 13, further comprising means for providing the video display signal to the display device.

15. The apparatus of claim 13 wherein the received video signal is a video signal having a first single frame format, the intermediate video signal is a pair of stereoscopic image signals representing a left eye view and a right eye view, and the video display signal is a video signal having a second signal frame format.

16. The apparatus of claim 15 wherein the first single frame format and the second single frame format is at least one of over/under, checkerboard, line interleaved, temporally interleaved, side by side, anaglyph, and quincunx.

17. The apparatus of claim 13 wherein the received video signal is a 2-dimensional video signal and the display device is a 3-dimensional display device, and wherein the means for converting the received video signal to an intermediate video signal includes the means for converting the 2-dimensional video signal to a pair of stereoscopic image signals.

18. The apparatus of claim 13 wherein the received video signal is at least one of a 2-dimensional video content signal and a 3-dimensional video content signal and the display device is a multi-view display device, and wherein the means for converting the intermediate video signal to a video display signal includes means for generating a multi-view video signal.

19. The apparatus of claim 13 wherein the received video signal is a multi-view video content signal and the display device is a 3-dimensional display device, and wherein the means for converting the received video signal to an intermediate video signal includes the means for generating left eye view content and right eye view content from the multi-view video signal.

20. The apparatus of claim 13 wherein the received video signal is at least one of a 2-dimensional video content signal and a 3-dimensional video content signal and the display device is a 2-dimensional display device, and wherein the means for converting the intermediate video signal to a video display signal includes the means for converting the output video signal to an anaglyph video signal.

21. The apparatus of claim 13, further comprising means for determining the at least one second parameter of the display device including:
  means for displaying a test pattern on the display device; and
  means for requesting a response from a viewer based on the test pattern.

22. The apparatus of claim 13, wherein the received video signal is a single frame video signal and the display device is a 3-dimensional display device, and wherein the means for converting the received video signal to an intermediate video signal includes the means for converting the single frame video signal to an intermediate video signal including at least two image signals.

23. The apparatus of claim 13, wherein the received video signal is a video signal including 2-dimensional video content and at least one of depth map content and disparity map content and the display device is a 2-dimensional display device, and wherein the means for converting the intermediate video signal to a video display signal includes means for removing the at least one of depth map content and disparity map content from the video display signal.

24. The apparatus of claim 13, wherein the received video signal is a 3-dimensional video signal and the display device is a 2-dimensional display device, and wherein the means for converting the intermediate video signal to a video display signal includes means for converting the 3-dimensional video signal to an anaglyph video signal.

25. A signal receiving apparatus comprising:
  an input stream processor, the input stream processor decoding a received input signal and separating the decoded signal into a video portion and an audio portion;
  a controller coupled to the input stream processor, the controller determining at least one characteristic of the video portion of the decoded signal and determining at least one first characteristic of a display device, the at least one first characteristic used to identify capabilities of the display device;
  a video signal processor circuit coupled to the input stream processor and controller, the video signal processor circuit converting the video portion of the decoded signal from a first video format to a second video format based on the at least one characteristic of the video portion of the decoded signal and the at least one first characteristic of the display device;
  a memory circuit coupled to the video signal processing circuit, the memory circuit providing for storage of the converted video signal in the second format for display on the display device at a later time;
  a display processing circuit coupled to the memory circuit, the display processing circuit retrieving the stored video signal in the second video format at the later time and converting the retrieved video signal from the second video format to a third video format based on at least one second, different characteristic of the display device, the at least one second, different characteristic identifying a specific display type and display output mode for the display device.

26. The apparatus of claim 25, further comprising an interface circuit coupled to the display processing circuit and controller, the interface circuit providing the video signal in the third video format to the display device.

27. The apparatus of claim 25, wherein the received input signal is a video signal having a first single frame format, the first converted video signal in the second video format is a pair of stereoscopic image signals representing a left eye view and a right eye view, and the video signal in the third video format is a video signal having a second signal frame format.

28. The apparatus of claim 27, wherein the first single frame format and the second single frame format is at least one of over/under, checkerboard, line-interleaved, temporally interleaved, side by side, anaglyph, and quincunx.

29. The apparatus of claim 25, wherein the received input signal is a single frame video signal and the display device is a 3-dimensional display device, and wherein the video signal processor circuit converts the single frame video signal to the first converted video signal in the second video format including at least two image signals.

30. The apparatus of claim 25, wherein the received input signal is a video signal including 2-dimensional video content and at least one of depth map content and disparity map content and the display device is a 2-dimensional display device, and wherein the display processing circuit removes the at least one of depth map content and disparity map content from the video signal in the third video format.

31. The apparatus of claim 25, wherein the received input signal is a 3-dimensional video signal and the display device is a 2-dimensional display device, and wherein the display processing circuit converts the 3-dimensional video signal to an anaglyph video signal.

32. The apparatus of claim 25, wherein the received input signal is a multi-view video signal and the display device is a 3-dimensional display device, and wherein the video signal processor circuit selects a left eye view signal and right eye view signal from the multi-view video signal.

33. The apparatus of claim 25, wherein the received input signal is a 2-dimensional video signal and the display device is a 2-dimensional display device, and wherein the video signal processor circuit converts the 2-dimensional video signal to a stereoscopic 3-dimensional signal and the display processing circuit converts the stereoscopic 3-dimensional signal to an anaglyph video signal.

34. The apparatus of claim 25, wherein the controller controls an interface circuit to
- display a test pattern on the display device and
- requests a response from a viewer based on the test pattern to determine the at least one second characteristic of the display device.

35. The apparatus of claim 25, wherein the received input signal is a 2-dimensional video signal and the display device is a 3-dimensional display device, and wherein the video signal processor circuit converts the 2-dimensional video signal to a pair of stereoscopic image signals.

36. The apparatus of claim 25, wherein the received input signal is at least one of a 2-dimensional video content signal and a 3-dimensional video content signal and the display device is a multi-view display device, and wherein the display processing circuit generates a multi-view video signal.

* * * * *